UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE DYES AND PROCESS OF MAKING THEM.

1,207,762.      Specification of Letters Patent.     Patented Dec. 12, 1916.

No Drawing.     Application filed February 4, 1913. Serial No. 746,175.

*To all whom it may concern:*

Be it known that I, MAX HENRY ISLER, chemist, citizen of the Swiss Republic, residing at Mannheim, Germany, have invented new and useful Improvements in Anthraquinone Dyes and Processes of Making Them, of which the following is a specification.

In the specification of application for U. S. Patent #1,093,427 is described the production of compounds by treating dibenzanthrone which possesses a constitution corresponding to the formula

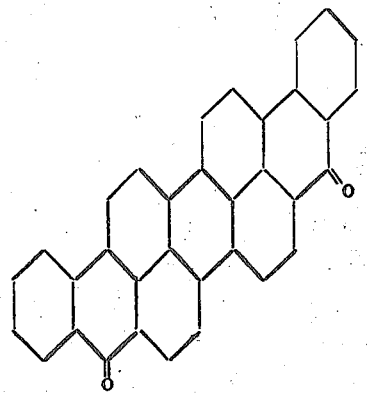

with an oxidizing agent, for instance manganese dioxid and sulfuric acid, either with or without subsequent treatment with a reducing agent, for instance sodium sulfid, and it is there stated that the said compounds dye cotton from a hydrosulfite vat olive-green shades. I have now discovered that these compounds can be converted into new coloring matters by heating them, either alone or preferably in the presence of a solvent or suspension agent or of a suitable condensing agent. The new coloring matters dye valuable green shades from a hydrosulfite vat and possess excellent covering power, brilliance of shade, fastness against the action of soap, and, compared with the initial products, very good fastness against the action of chlorin.

My new coloring matters consist, when dry, of green powders, are insoluble in dilute acids and alkalis, are very difficultly soluble in the organic solvents of high boiling point, but are soluble in alkaline hydrosulfite yielding blue vats.

The following example will serve to illustrate further the nature of my invention, which, however, is not limited to this example. The parts are by weight. Introduce 10 parts of the oxidation product obtained according to either of the examples of the said Patent #1,093,427 into 100 parts of para-toluidin, add 5 parts of dry anhydrous boric acid, and heat either at 160° C. or at boiling point, until a test portion shows that no unaltered initial material is present. Then remove the para-toluidin, for instance by means of alcohol or with dilute hydrochloric acid. The product can then be dissolved in alkaline hydrosulfite solution and precipitated again by passing air through the violet-blue vat obtained, whereupon the coloring matter separates out in green flakes. It is soluble in concentrated sulfuric acid with a bluish red color and is insoluble in dilute acids and alkalis and very difficultly soluble in most organic solvents, including those of high boiling point. It dyes cotton, from a vat, brilliant green shades. In this example, instead of para-toluidin, other solvent or suspension agent can be employed, such for instance as nitrobenzene, naphthalene, or cresol, and instead of boric acid, other condensing agent can be employed. Similar or identical products can be obtained by treating, in a similar manner, the reduction products obtainable according to Example 3 of the said Patent No. 1,093,427.

Now what I claim is:—

1. The process of producing coloring matters of the anthraquinone series by heating an oxidation product of dibenzanthrone.

2. The process of producing coloring matters of the anthraquinone series by heating an oxidation product of dibenzanthrone in the presence of para-toluidin and boric acid.

3. As new articles of manufacture the coloring matters of the anthraquinone series which can be obtained by heating an oxidation product of dibenzanthrone, which new coloring matters consist, when dry, of green powders, are insoluble in dilute acids and alkalis, are very difficultly soluble in the organic solvents of high boiling point, but are soluble in alkaline hydrosulfite yielding blue vats which dye cotton brilliant olive-green shades of excellent fastness against the action of soap, and very good fastness against the action of chlorin.

In testimony whereof I have hereunto set my hand in the presence of two subscribing witnesses.

MAX HENRY ISLER.

Witnesses:
J. ALEC. LLOYD,
JOSEPH PFEIFFER.